US012244988B2

(12) United States Patent
Wang et al.

(10) Patent No.: US 12,244,988 B2
(45) Date of Patent: Mar. 4, 2025

(54) SOUND AMPLIFICATION DEVICE

(71) Applicant: SHENZHEN SHOKZ CO., LTD., Guangdong (CN)

(72) Inventors: Liwei Wang, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 199 days.

(21) Appl. No.: 18/047,646

(22) Filed: Oct. 18, 2022

(65) Prior Publication Data

US 2023/0058586 A1 Feb. 23, 2023

Related U.S. Application Data

(63) Continuation of application No. PCT/CN2021/092311, filed on May 8, 2021.

(30) Foreign Application Priority Data

Nov. 3, 2020 (CN) ......................... 202011209898.5
Nov. 3, 2020 (CN) ......................... 202022510809.2

(51) Int. Cl.
*H04R 1/10* (2006.01)
*H04R 1/28* (2006.01)

(52) U.S. Cl.
CPC ............. *H04R 1/10* (2013.01); *H04R 1/2807* (2013.01)

(58) Field of Classification Search
CPC ...... H04R 1/10; H04R 1/2807; H04R 1/1008; H04R 1/1091; H04R 1/105; H04R 1/16; H04R 1/28; H04R 1/2811; H04R 2201/10; H04R 5/0335
USPC ........................................ 381/370, 374, 376
See application file for complete search history.

(56) References Cited

U.S. PATENT DOCUMENTS

2015/0122575 A1* 5/2015 Park ....................... G10K 11/04 181/182
2018/0199127 A1 7/2018 Hosoi et al.
2018/0352061 A1 12/2018 Hosoi et al.
2020/0275188 A1* 8/2020 Chang .................. H04R 1/1041

FOREIGN PATENT DOCUMENTS

CN 205647994 U 10/2016
CN 205987264 U 2/2017
CN 112261538 A 1/2021
CN 214101709 U 8/2021

OTHER PUBLICATIONS

International Search Report in PCT/CN2021/092311 mailed on Aug. 11, 2021, 7 pages.

* cited by examiner

*Primary Examiner* — Ahmad F. Matar
*Assistant Examiner* — Sabrina Diaz
(74) *Attorney, Agent, or Firm* — METIS IP LLC

(57) ABSTRACT

The present disclosure is directed to a sound amplification device. The sound amplification device comprises a vibrating body, the vibrating body including at least one first vibration surface and at least one contact region for contacting with a vibration source. The vibration source detachably contacts with a contact region, an area of a first vibration surface is larger than an area of the contact region, the vibration source is configured to generate vibration, and the vibration is transmitted to the first vibration surface through the contact region, and further transmitted outwards through the first vibration surface.

17 Claims, 12 Drawing Sheets

SOUND AMPLIFICATION DEVICE

CROSS-REFERENCE TO RELATED APPLICATIONS

This application is a continuation of International patent application Ser. No. PCT/CN2021/092311, filed on May 8, 2021, which claims priority of Chinese Patent Application No. 202022510809.2, filed on Nov. 3, 2020, and Chinese Patent Application No. 202011209898.5, filed on Nov. 3, 2020, the entire contents of which are incorporated herein by reference.

TECHNICAL FIELD

This present disclosure relates to acoustic technology, and more particularly relates to a sound amplification device.

BACKGROUND

A vibration source usually refers to a device that may generate vibration. The vibration of the vibration source may drive air to vibrate together and produce sound that is received by human ears. However, under normal circumstances, the vibration source may only facilitate sound transmission by causing air to vibrate within a specific range. In non-ideal cases, it is even possible that air vibration transmission efficiency is extremely low because a contact area between the vibration source and the air is too small, for example, a bone conduction earphone. Therefore, it is desirable to provide a sound amplification device that may "amplify" a vibration signal generated by the vibration source to achieve effective transmission in the air.

SUMMARY

The embodiment of the present disclosure provides a sound amplification device, comprising a vibrating body, the vibrating body including at least one first vibration surface and at least one contact region for contacting with a vibration source; wherein, the vibration source detachably contacts with a contact region, an area of a first vibration surface is larger than an area of the contact region, the vibration source is configured to generate vibration, and the vibration is transmitted to the first vibration surface through the contact region, and further transmitted outwards through the first vibration surface.

In some embodiments, the vibrating body includes an outer box, an inner wall of the outer box constitutes a first chamber, an outer wall of the outer box constitutes the first vibration surface, and the contact region is disposed on the outer wall of the outer box.

In some embodiments, the contact region is recessed inward relative to the outer wall of the outer box to accommodate the vibration source.

In some embodiments, a direction of the vibration received by the contact region is perpendicular to at least partial area of the outer box.

In some embodiments, the vibrating body further includes at least one inner box, the at least one inner box being arranged in the first chamber and dividing the first chamber into at least two sub-chambers.

In some embodiments, a volume ratio of any two sub-chambers in the at least two sub-chambers is between 1:10 and 1:2.

In some embodiments, the sound amplification device includes at least two resonance frequencies, and the at least two resonance frequencies include a first resonance frequency and a second resonance frequency adjacent to the first resonance frequency, wherein the second resonance frequency is below a half of the first resonance frequency or exceeds twice the first resonance frequency.

In some embodiments, the vibration source includes a third resonance frequency and a fourth resonance frequency, and the resonance frequency closest to the third resonance frequency among the at least two resonance frequencies of the sound amplification device is below a half of the third resonance frequency or exceeds twice the third resonance frequency, the resonance frequency closest to the fourth resonance frequency among the at least two resonance frequencies of the sound amplification device is below a half of the fourth resonance frequency or exceeds twice the fourth resonance frequency.

In some embodiments, at least one of the inner box and the outer box has a public region, and at least one contact region is arranged in the common region.

In some embodiments, an elastic modulus of the contact region is smaller than elastic moduli of other regions of the vibrating body.

In some embodiments, the elastic modulus of the contact region is 1-3 GPa, and elastic moduli of other regions of the vibrating body are 6-8 GPa.

In some embodiments, a pressing force between the vibration source and the contact region is 0.3N-0.4N when the vibration source is accommodated in the contact region.

In some embodiments, the vibration source includes a second vibration surface, and when the vibration source is accommodated in the contact region, the contact region between the vibration source and the contact region is not less than 50% of the second vibration surface.

In some embodiments, the vibration source is a part of a bone conduction earphone, and the vibration is generated by the part of the bone conduction earphone.

In some embodiments, a wireless charging module is configured on the vibrating body, and the wireless charging module is used for wirelessly charging the bone conduction earphone when the part of the bone conduction earphone is accommodated in the contact region.

In some embodiments, the contact region is provided with a contact detection element, and the wireless charging module enables a wireless charging function to charge the bone conduction earphone when the contact detection element detects that the part of the bone conduction earphone is accommodated in the contact region.

In some embodiments, the contact detection element includes at least one of a pressure sensor, a short-range communication module, or a travel switch.

In some embodiments, the sound amplification device further includes a wireless communication module and a control module, wherein the wireless communication module is configured to establish a wireless communication connection with the bone conduction earphone when the contact detection element detects that the part of the bone conduction earphone is accommodated in the contact region, and the control module is configured to control the bone conduction earphone based on the wireless communication connection.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
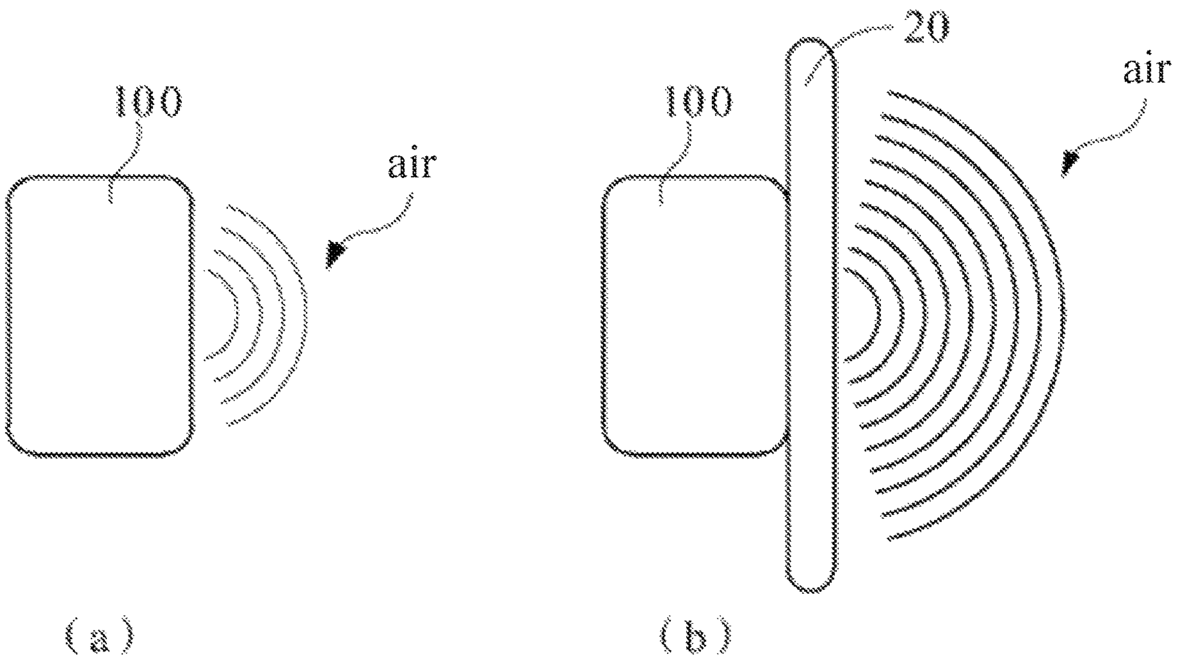
FIG. 1 is a schematic diagram of the principle of air vibration caused by mechanical vibration according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Vibration of the vibration source may drive air to vibrate together, thereby generating sound that is received by human ears. However, due to influence of the contact area between the vibration source and air, under normal circumstances, the vibration source may only achieve sound transmission by causing air to vibrate within a specific range. In some cases that are less ideal, it is even possible that air vibration transmission efficiency is extremely low because the contact area between the vibration source and the air is too small, for example, when the vibration source is a helical coil; for another example, when the vibration source is plate-shaped, but the contact area with air is less than 0.1 $cm^2$. Therefore, in some practical application scenarios, it may be necessary to "amplify" vibration signal generated by the vibration source to enhance its sound transmission.

The sound amplification device according to the embodiments of the present disclosure may be described in detail below with reference to the accompanying drawings.

FIG. 1 is a schematic diagram of the principle of air vibration caused by mechanical vibration according to some embodiments of the present disclosure.

Referring to FIG. 1, wherein, (a) may represent a principle schematic diagram illustrating air vibration caused by the vibration source 100 directly, (b) may represent a principle schematic diagram illustrating air vibration caused by the sound amplification device 20. It may be seen from FIG. 1 that after the vibration source 100 is connected to the sound amplification device 20, vibration generated by the vibration source 100 may be transmitted to the sound amplification device 20. Since the sound amplification device 20 has a larger air contact area compared with the vibration source 100, the sound amplification device 20 may cause more air to vibrate so that more air may become sound transmission medium, and energy conversion efficiency of air transmission may be improved, so as to achieve the purpose of enhancing sound transmission effect.

Based on this, in some embodiments, the sound amplification device 20 may include the vibrating body, specifically, the vibrating body including at least one vibration surface (which may be defined as a "first vibration surface") and at least one contact region for contacting with the vibration source 100. The contact region may be used to contact the vibration source 100 to receive vibration generated by the vibration source 100 and transmit vibration to the first vibration surface. The first vibration surface may receive vibration and cause air vibration that is in contact with it, and then transmits vibration signal generated by the vibration source 100 in air conduction.

In some embodiments, in order to ensure that the sound amplification device 20 may cause more air vibration compared to the vibration source 100, thereby achieving purpose of enhancing sound transmission effect, area of the first vibration surface may be larger than area of the contact region. Specifically, in some embodiments, area of the first vibration surface may be at least 5 times area of the contact region. For example, in some embodiments, area of the first vibration surface may be 5 times area of the contact region. In some embodiments, area of the first vibration surface may be 6-10 times area of the contact region. In some embodiments, area of the first vibration surface may be more than 10 times area of the contact region.

In some embodiments, the above-mentioned vibrating body may be a plate-shaped structure, a column-shaped structure, a spherical structure, an ellipsoid-shaped structure, a tubular structure, a horn-shaped structure, or other structures that may increase the contact area with air compared with the vibration source, wherein, the size of the vibrating body may be set according to actual needs, which is not specifically limited in the present disclosure. In addition, material of the above-mentioned vibrating body may be referred to later, and it is not described in detail here.

In some embodiments, the above-mentioned vibrating body may be a solid or hollow body structure. For example, when the vibrating body is a plate-like structure, it may be a solid body structure, and the two surfaces with the largest contact area with air may be used as the first vibration surface, and the contact region may be arranged on one of the two surfaces. When the vibrating body is a cylindrical structure, it may be a hollow body structure, in other words, the interior of the vibrating body may include a cavity structure. In this case, the top surface, bottom surface, or side wall of the cylindrical structure may be used as the first vibration surface, the contact region may be arranged on its top surface, bottom surface, or side wall. For more details of the contact region and the first vibration surface, refer to the following, it is not described in detail here.

It should be noted that in some embodiments when there is a plurality of vibration sources 100, the vibrating body may include a plurality of contact regions, and a plurality of contact regions may be arranged at the same or different positions. In some embodiments, the vibration source 100 may represent a device capable of converting electrical signals, optical signals, or other types of signals into corresponding vibration signals or sound signals, such as horns, speakers, etc. In some embodiments, the vibration source 100 may be part of the bone conduction earphone. For more details about the vibration transmission between the bone conduction earphone and the sound amplification device 20, refer to FIG. 11 and its related descriptions.

Figure 2:
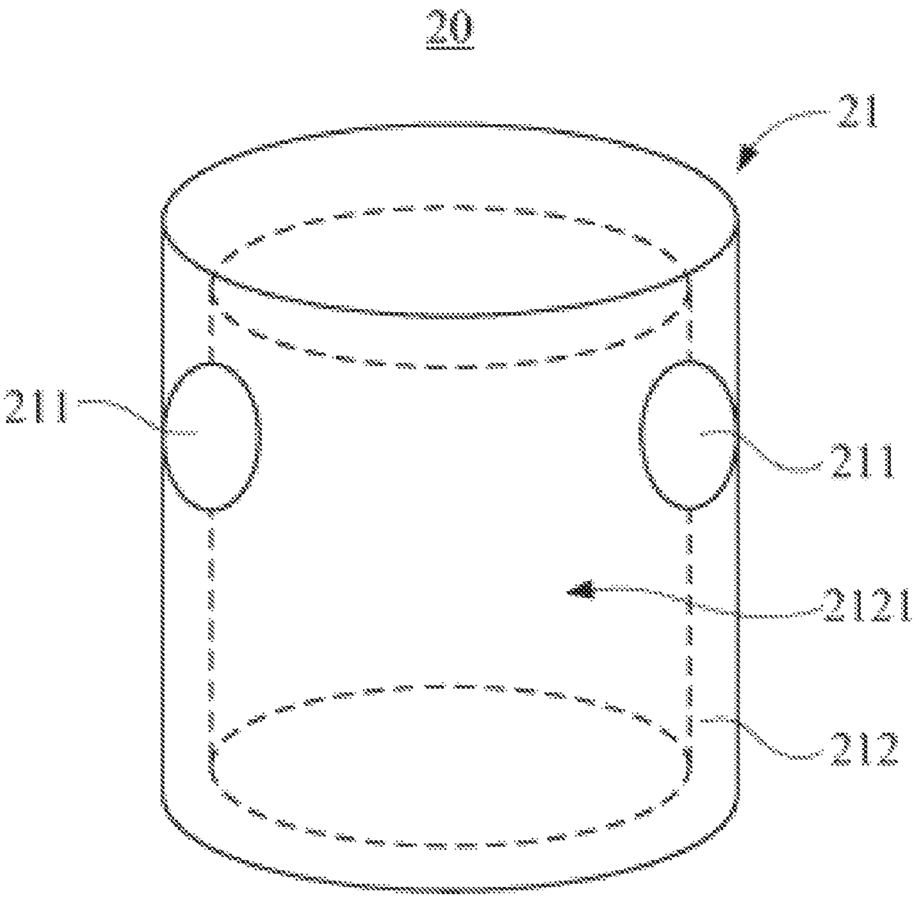
FIG. 2 is a schematic diagram of the sound amplification device according to some embodiments of the present disclosure.

FIG. 2 is a schematic diagram of the sound amplification device according to some embodiments of the present disclosure.

Referring to FIG. 2, in some embodiments, the sound amplification device 20 may be a cylindrical structure, which may include a cylindrical box 21. The cylindrical box 21 may be part of the vibrating body. Based on the above-mentioned descriptions, in some other embodiments, the box 21 may be a plate-shaped structure, a speaker-shaped structure, a cavity structure, etc. The above structure may increase area of contact with air, thereby improving volume, sound quality, etc. of sound heard by users.

In combination with FIG. 2, the present disclosure takes the box 21 as cavity structure as an example of an exemplary description. In some embodiments, the box 21 may be set on the contact region 211 which is used in contact with the vibration source 100, so that vibration generated by the vibration source 100 may be transmitted to the box 21 through the contact region 211. At this time, the box 21 may further convert vibration into sound waves audible to human ears. In other words, the vibration source 100 may be in contact with the box 21 through the contact region 211 provided on the box 21, so that mechanical vibration generated by the vibration source 100 may drive the box 21 to vibrate with it, and vibration generated by the box 21 is further transmitted by air as a medium, resulting in transmission of sound. In some embodiments, contact between the vibration source 100 and the contact region 211 may be achieved in a detachable manner. For example, the vibration source 100 may be fixed in the contact region 211 and contacted with the contact region 211 by means of a snap connection. For another example, the vibration source 100 may be fixed on the contact region 211 and contacted with the contact region 211 by magnetic adsorption.

For example, as shown in FIG. 2, in some embodiments, the box 21 may include an outer box 212. The outer box 212 may be a spherical, cylindrical or other structure containing a cavity inside. It should be noted that the inner wall of the outer box 212 may avoid sharp protrusions and/or depressions as much as possible, so as to optimize acoustic expressiveness (e.g., sound quality, volume, etc.) of the box 21. In some embodiments, the inner wall of the outer box 212 may be set to form a first chamber 2121. Structural parameters of volume and shape of the first chamber 2121 may adjust acoustic expressiveness of the box 21. For example, the larger volume of the first chamber 2121, the better acoustic expressiveness of the box 21 in low-frequency band (such as frequency of less than 500 Hz). The more regular and round shape of the first chamber 2121, the better acoustic performance of the box 21.

In some embodiments, the contact region 211 may be set on the outer wall of the outer box 212. The outer wall of the outer box 212 may also constitute the first vibration surface of the sound amplification device 20. Vibration generated by the vibration source 100 may be transmitted to the first vibration surface via the contact region 211 so that the outer box 212 vibrates synchronously with the vibration source 100 and vibration energy is transmitted outward by causing air to vibrate to form a sound audible to human ears.

Figure 3:
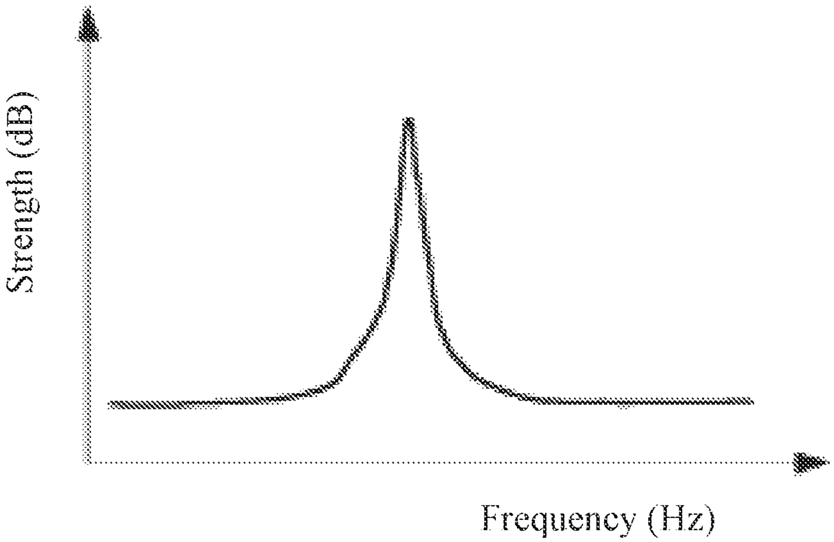
FIG. 3 is a schematic diagram of the frequency response curve of the sound amplification device according to some embodiments of the present disclosure.

As shown in FIG. 3, in some embodiments, when the box 21 is cylindrical structure and the internal contains the first chamber 2121, the sound amplification device 20 may contain a resonance frequency. In other words, in some embodiments, the frequency response curve of the box 21 may form a peak or valley.

In some embodiments, when the box 21 is a cylindrical structure, and the first chamber 2121 inside is also cylindrical, the resonance frequency of the sound amplification device 20 may be expressed as follows:

$$\omega_1 = \left(\frac{\pi}{l}\right)^2 \sqrt{\frac{a^2 E}{\rho / g}}, \quad (1)$$

$$\omega_2 = \left(\frac{\pi^2}{2} + \frac{1}{a^2}\right) \sqrt{\frac{E h^2 g}{12(1-\mu^2)\rho}}, \quad (2)$$

$$\omega^2 = \omega_1^2 + \omega_2^2, \quad (3)$$

$$f = \frac{\omega}{2\pi}, \quad (4)$$

I may represent the height of the cylindrical structure, a may represent the radius of the cylindrical structure, h may represent the thickness of the shell (that is, the wall thickness of the box 21), E may represent the elasticity coefficient of the shell (that is, the elastic modulus of the material used for the box body 21), ρ may represent the density of the shell, μ may represent the loose ratio of the shell, g represents the acceleration of gravity, ω1 and ω2 may represent the angular frequency component of the radial and axis of the cylindrical structure respectively, ω may represent the natural angular frequency of the cylindrical structure, f may represent the inherent frequency of the cylindrical chamber resonance peak.

It should be noted that the above equation (1), (2), (3), and (4) are only exemplary descriptions, which are mainly aimed at a sound amplification device with a cylindrical structure and a first chamber inside. Technical personnel in the art should know that when the sound amplification device is other shapes or other structures, other equations may be used to calculate its resonance frequency, it is not discussed in detail here.

In some embodiments, the first chamber 2121 may be a closed space, that is, medium (such as air) in the first chamber 2121 is isolated from external environment. At this time, during the process that the outer box 212 vibrates synchronously with the vibration source 100, medium in the first chamber 2121 may undergo a large pressure change accordingly, which in turn reacts to vibration of the outer box 212. In some other embodiments, the first chamber 2121 may be an open space, that is, medium (such as air) in the first chamber 2121 connects with external environment. At this time, during the process that the outer box 212 vibrates synchronously with the speaker 11, medium in the first chamber 2121 may undergo a small pressure change accordingly, which has a small impact on vibration of the outer box 212. In other words, set the first chamber 2121 to a closed space or open space, which may also adjust acoustic expressiveness of the box 21.

In some embodiments, considering that within a certain range, the greater rigidity of the contact region 211, the smaller deformation produced during structural force, which is also conducive to transmission of mechanical vibration. However, if rigidity of the contact region 211 is too large, during the process that the outer box 212 vibrates synchronously with the vibration source 100, relative movement is easily generated between the contact region 211 and the vibration surface of the vibration source 100 (for example, the contact area or the contact position changes), thereby reducing transmission effect of mechanical vibration, and may even collide with the vibration source 100 and cause abnormal noise.

In some embodiments, the elastic modulus of the contact region 211 may be set to the elastic modulus of other areas less than in the outer box 212. In other words, the outer box 212 may be soft in the contact region 211 to ensure efficiency of speaker 11 in transmitting mechanical vibration to the outer box 212 and avoid abnormal noise.

Exemplarily, in some embodiments, the elastic modulus of the contact region 211 may be 1-3 GPa, and the elastic modulus in other regions of the outer box 212 is 6-8 GPa. Specifically, in some embodiments, the elastic modulus of the contact region 211 may be 1-2 GPa. In some embodiments, the elastic modulus of the contact region 211 may be 2-3 GPa. In some embodiments, the elastic modulus of the contact region 211 may be 1.5-2.5 GPa. Based on this, in some embodiments, the outer box 212 may use a two-color injection molding process. Material of the outer box 212 in the contact region 211 may be polycarbonate, polyamide, acrylic-butadiene-lyzyrene-phenyeyrene co-polymer, etc., the outer box 212 in other regions may be a mixture of materials such as polycarbonate, polyamide, and acrylonitrile-butadiene-styrene copolymer with glass fiber or carbon fiber (for example, adding 20%-50% glass fiber to polycarbonate).

It should be noted that in some embodiments, by controlling the elastic modulus of the contact region 211 to be 1-3 GPa and the elastic modulus of other regions of the outer box 212 to be 6-8 GPa, it is also possible to prevent the outer box 212 from generating high-order resonance during vibration transmission process and affecting its sound transmission effect. Specifically, it may be avoided that vibration energy generated by the vibration source 100 may not be transmitted to air because it is completely consumed to cause deformation of the shell surface of the outer box 212 so that it may not transmit sound to outside by air conduction.

In some embodiments, the contact region 211 may be recessed relative to the outer box 212, that is, the contact region 211 may have a certain depth to accommodate the vibration source 100, thereby increasing accuracy and reliability of contact between the vibration source 100 and the outer box 212. Based on this, specific position of the contact region 211 on the outer box 212 may be reasonably designed according to acoustic expressiveness of the outer box 212, and there is no restriction here. For example, in some embodiments, the contact region 211 may be set on the side wall of the outer box 212. In some embodiments, the contact region 211 may be set on the top or bottom of the outer box 212.

Since the contact region 211 may be recessed, specific position of the contact region 211 on the outer box 212 is determined after a reasonable design according to acoustic performance of the outer box 212. In other words, the vibration source 100 may be connected to the same position on the outer box 212 every time, so as to increase consistency of acoustic performance when the outer box 212 cooperates with the vibration source 100.

In some embodiments, card connection structure or damping structure may be set within the contact region 211 to ensure stability and reliability of the vibration source 100 when it is accommodated in the contact region 211, and to prevent the vibration source 100 from falling off from the contact region 211 during the vibration process. For example, in some embodiments, the vibration source 100 may be fixed in corresponding recess of the contact region 211 by snaps. In some embodiments, resistance of the vibration source 100 to movement of the contact region 211 may be increased by providing anti-skid strips on the side wall of the depression. In some embodiments, the vibration source 100 may be fixed on the contact region 211 by electromagnetic adsorption.

In some embodiments, the vibration direction generated by the vibration source 100 may be perpendicular to at least a part of the outer box 212, for example, the vibration direction generated by the vibration source 100 may be at least perpendicular to the contact region 211. It should be noted that when the vibration direction generated by the vibration source 100 is perpendicular to the contact region 211, vibration transmission effect may be the best. In some other embodiments, the vibration direction generated by the vibration source 100 may not be perpendicular to the contact region 21. For example, the vibration direction generated by the vibration source 100 may be at a certain inclination angle to the plane corresponding to the contact region 211. When the vibration direction generated by the vibration source 100 is not perpendicular to the contact region 211, vibration transmission effect thereof may be weakened. Therefore, in some embodiments, in order to ensure vibration transmission effect between the two, the inclination angle between the vibration direction of the vibration source 100 and the plane corresponding to the contact region 211 may be controlled between 45° and 90°.

Figure 4:
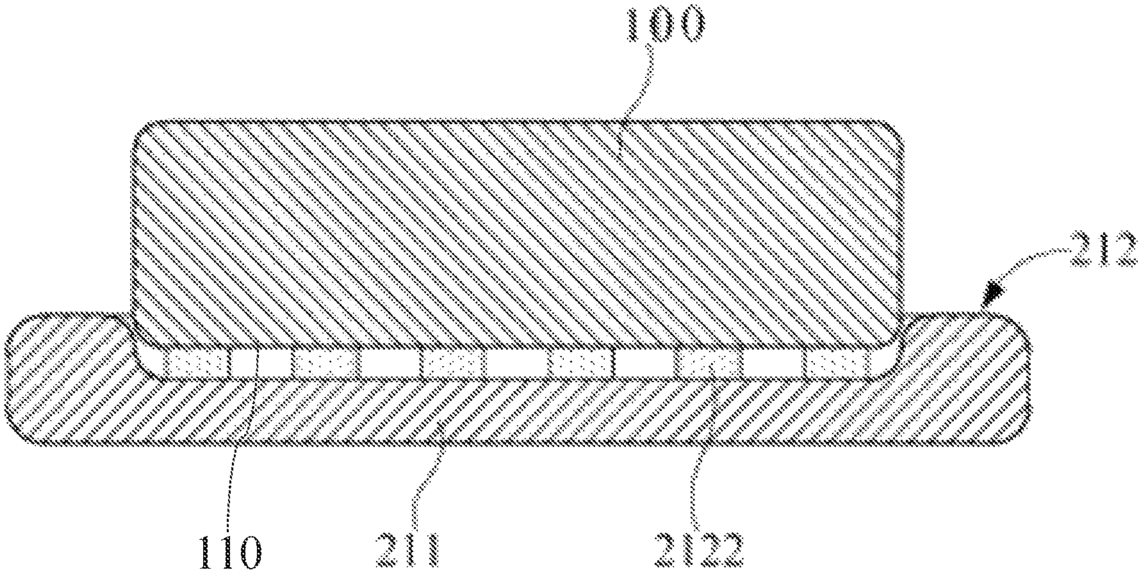
FIG. 4 is a schematic diagram of the contact region according to some embodiments of the present disclosure.
Figure 5:
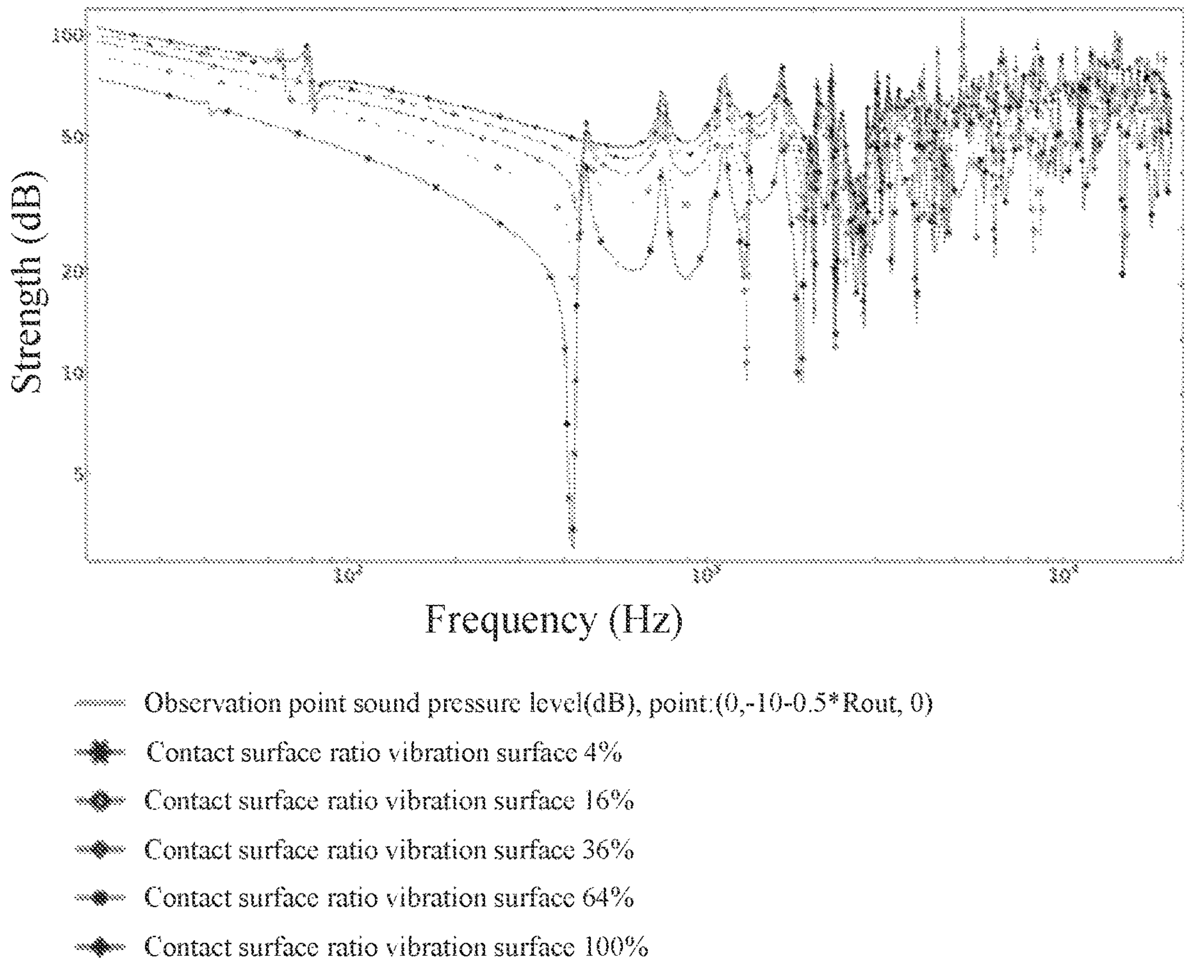
FIG. 5 is a schematic diagram of the frequency response curve of the sound amplification device according to some embodiments of the present disclosure.

Referring to FIG. 4 and FIG. 5, wherein FIG. 4 is a schematic diagram of the contact region according to some embodiments of the present disclosure, FIG. 5 is a schematic diagram of the frequency response curve of the sound amplification device according to some embodiments of the present disclosure.

As shown in FIG. 4, in some embodiments, the outer box 212 may be provided with a plurality of protrusions 2122 distributed at intervals in the contact region 211, and the protrusions 2122 may be used to adjust size of the contact surface formed by the outer box 212 between the contact region 211 and the vibration source 100 ( In short, adjust size of the contact surface formed by the vibration source 100 and the outer box 212), further, to a certain extent, strength of transmission of mechanical vibration of the vibration source 100 to the outer box 212 is adjusted.

Specifically, in combination with FIG. 4, when the vibration source 100 is pressed and fixed to the corresponding contact region 211, the vibration surface 110 (which may be defined as "the second vibration surface") of the vibration source 100 is in contact with the protrusions 2122. Obviously, the greater the number of protrusions 2122 in contact with the second vibration surface 110, the larger the total area of the surface of the protrusions 2122 in contact with the vibration source 100, and the larger the contact surface formed between the vibration source 100 and the outer box 212; correspondingly, the greater the proportion of the contact surface to the second vibration surface 110.

Referring to FIG. 5, for different proportions of the contact surface to the vibration surface (the second vibration surface 110), the overall trend of the frequency response curve is generally consistent, which shows that size of the contact surface formed by the outer box 212 between the contact region 211 and the second vibration surface 110 of the vibration source 100 has less influence on sound quality. Further, as the proportion of the vibration surface of the contact surface gradually increases, the frequency response curve is biased towards greater vibration intensity, that is, the greater the corresponding volume. Based on this, in some embodiments, the proportion of the contact surface between the contact region 211 and the vibration source 100 to the second vibration surface 110 may not be less than 50%, that is, the contact surface formed between the contact region 211 and the second vibration surface 110 of the vibration source 100 is not less than 50%. It is worth noting that: for the low frequency below 400 Hz, difference between sound volume when the ratio of the contact surface to the second vibration surface is 25% and sound volume when the ratio of the contact surface to the second vibration surface is 100% is about 12 dB, and it shows that the area of the contact surface between the contact region 211 and the vibration source 100 is consistent with the total area of the second vibration surface 110, which is beneficial to maximizing sound volume.

It should be explained that: disposing the protrusions 2122 in the contact region 211 may adjust size of the contact surface formed by the vibration source 100 and the outer box 212, and disposing the depression in the contact region 211 (contrary to the protrusions 2122 in structure) may also adjust size of the contact surface formed by the vibration source 100 and the outer box 212. In some embodiments, whether it is the protrusions 2122 or the depression, it may be integrally formed with the contact region 211.

Figure 6:
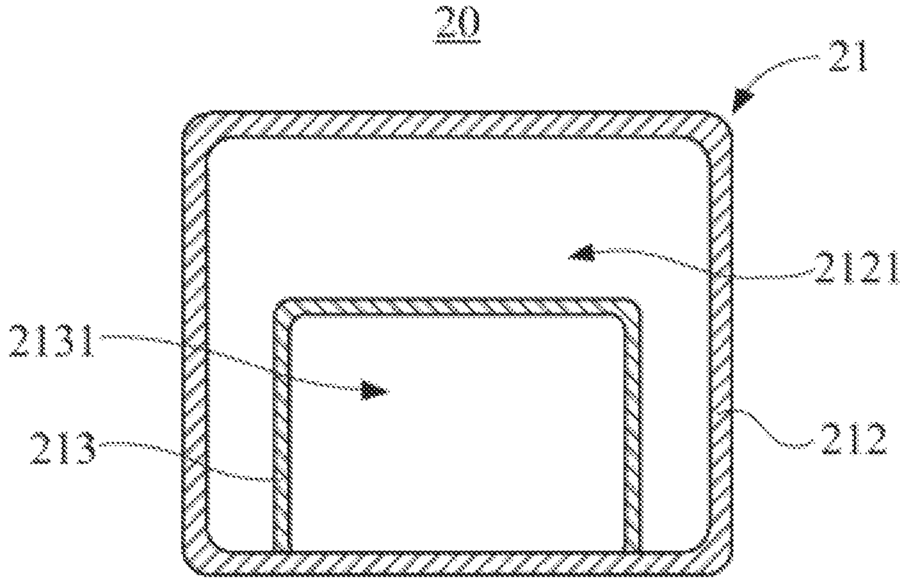
FIG. 6 is a schematic diagram of the sound amplification device according to the other embodiment of the present disclosure.
Figure 7:
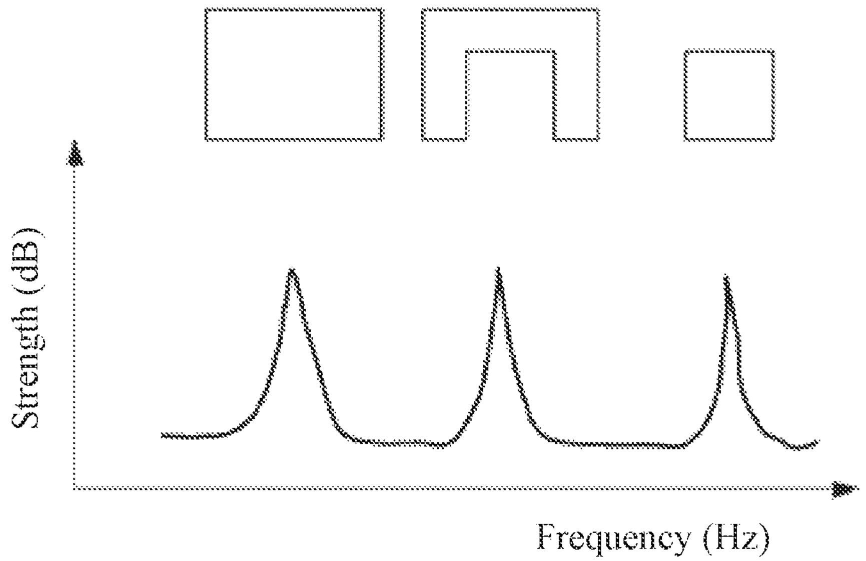
FIG. 7 is a schematic diagram of the acoustic principle of the sound amplification device shown in FIG. 6.
Figure 8:
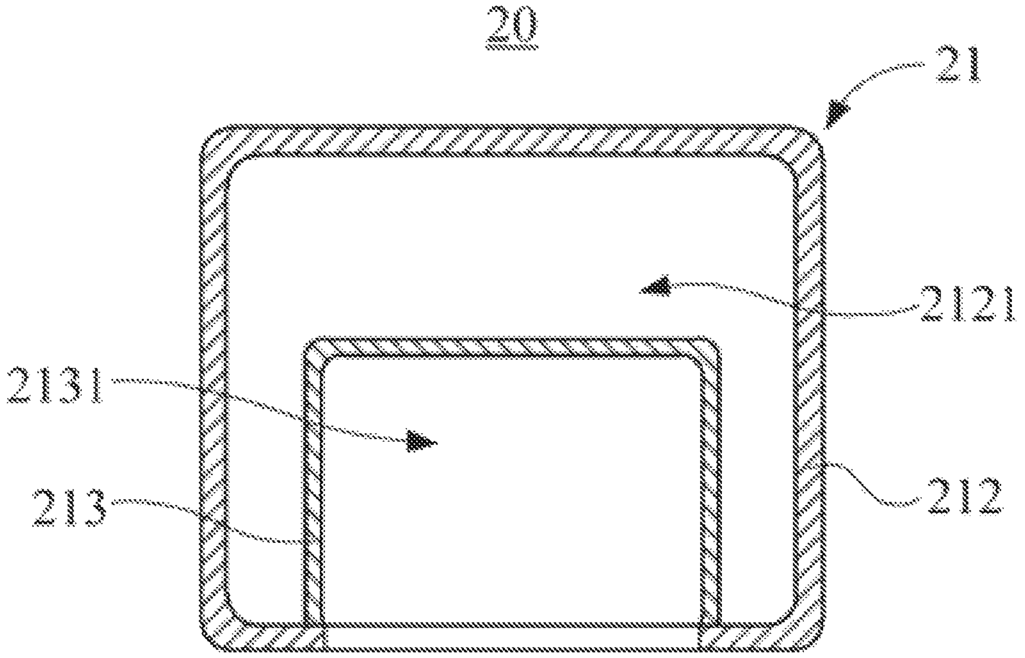
FIG. 8 is a schematic diagram of the sound amplification device according to the other embodiment of the present disclosure.
Figure 9:
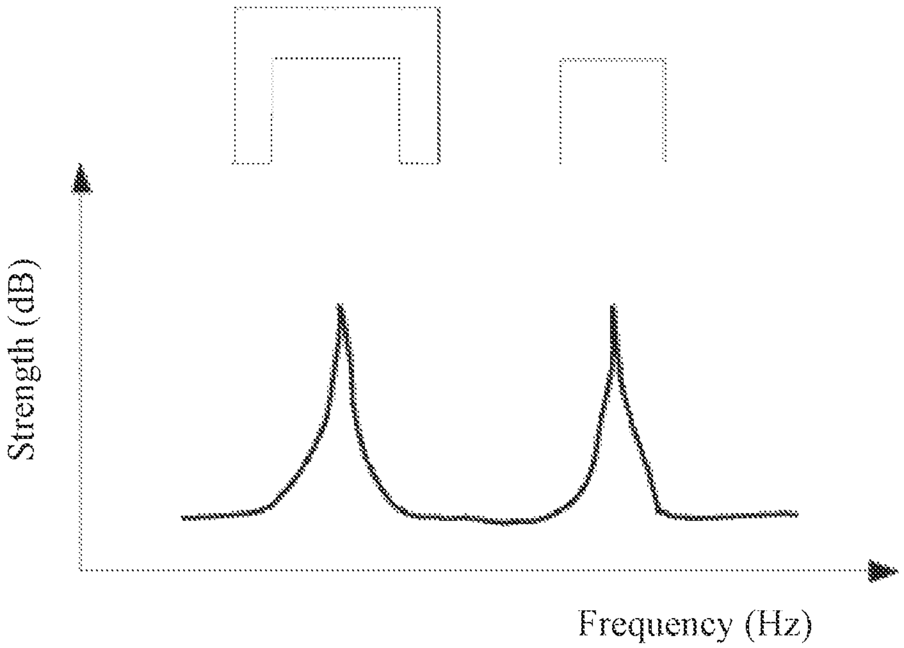
FIG. 9 is a schematic diagram of the acoustic principle of the sound amplification device shown in FIG. 8.

Referring to FIG. 6 to FIG. 9, wherein FIG. 6 is a schematic diagram of the sound amplification device according to the other embodiment of the present disclosure, FIG. 7 is a schematic diagram of the acoustic principle of the sound amplification device shown in FIG. 6, FIG. 8 is a schematic diagram of the sound amplification device according to the other embodiment of the present disclosure, FIG. 9 is a schematic diagram of the acoustic principle of the sound amplification device shown in FIG. 8.

As shown in FIG. 6 or FIG. 8, in some embodiments, box 21 may also include the inner box 213. The inner box 213 may be disposed in the first chamber 2121 and divide the first chamber 2121 into at least two sub-chambers, for example, the inner wall of the inner box 213 may enclose a sub-chamber (which may be defined as the second chamber 2131), another sub-chamber may be formed between the outer wall of the inner box 213 and the inner wall of the outer box 212. In this way, the inner box 213 may form resonance with the outer box 212 in order to increase bandwidth of the box 21 (that is, the frequency bandwidth) and optimize sound quality of the box 21. In other words, the box 21 shown in FIG. 2 may simply be regarded as a single-cavity structure, which may achieve amplification effect of sound of a narrow-frequency band; the box body 21 shown in FIG. 6 or FIG. 8 may simply be regarded as a dual-cavity structure and the dual-cavity structure is easier to achieve amplification of sound of a wider frequency band compared to the single-cavity structure. In theory, the more the number of cavities of the box 21, the easier it is to achieve amplification of sound of the wider frequency band, and the more conducive to optimizing sound quality.

It should be noted that: combined with FIG. 6, FIG. 8 and FIG. 2, because the inner box 213 may be set in the outer box 212 so the second chamber 2131 may simply be regarded as part of the first chamber 2121. In other words, combined with FIG. 6 and FIG. 8, the first chamber 2121 is divided into two relatively independent spaces by the inner box 213, and one of the spaces is the second chamber 2131.

Similar to the outer box 212, in some embodiments, the inner box 213 may be spherical, columnar, and other structures. In the same way, in some embodiments, the inner box 213 may avoid sharp protrusion and/or depression as much as possible to optimize acoustic expression of the box 21.

Referring to FIG. 6, in some embodiments, the second chamber 2131 may be a closed space, that is, medium (such as air) in the second chamber 2131 may be isolated from external environment. At this time, during the process of the box body 21 vibrating synchronously with the vibration source 100, medium in the first chamber 2121 and medium in the second chamber 2131 both undergo large pressure changes, which in turn react to vibration of the outer box body 212 and the inner box body 213, that is, it has a greater impact on vibration of the box body 21. Referring to FIG. 7, at this time the box 21 may be split into three parts. In some embodiments, the three parts may have different resonance frequencies. Correspondingly, the frequency response curve of the box 21 may form three peaks or valleys. It should be noted that in some embodiments, the first chamber 2121 may refer to the space surrounded by the outer wall of the inner box 213 and the inner wall of the outer box 212.

Referring to FIG. 8, in some other embodiments, the second chamber 2131 may be an open space, that is, medium (such as air) in the second chamber 2131 connects with the external environment. At this time, during the process of the box body 21 vibrating synchronously with the vibration source 100, medium in the first chamber 2121 (the space surrounded by the outer wall of the inner box 213 and the inner wall of the outer box 212) undergoes large pressure changes, and medium in the second chamber 2131 undergoes small pressure changes, which also in turn react to vibration of the outer box body 212 and the inner box body 213, that is, it has a greater impact on vibration of the box body 21. Referring to FIG. 9, at this time the box 21 may be split into two parts. Correspondingly, the frequency response curve of the box 21 may form two peaks or valleys. It should be noted that in some other embodiments, the first chamber 2121 (the space surrounded by the outer wall of the inner box 213 and the inner wall of the outer box 212) and the second chamber 2131 may be set to open space at the same time. At this time, the outer box body 212 and the inner box body 213 may be connected to each other through structures such as connecting columns.

Figure 10:
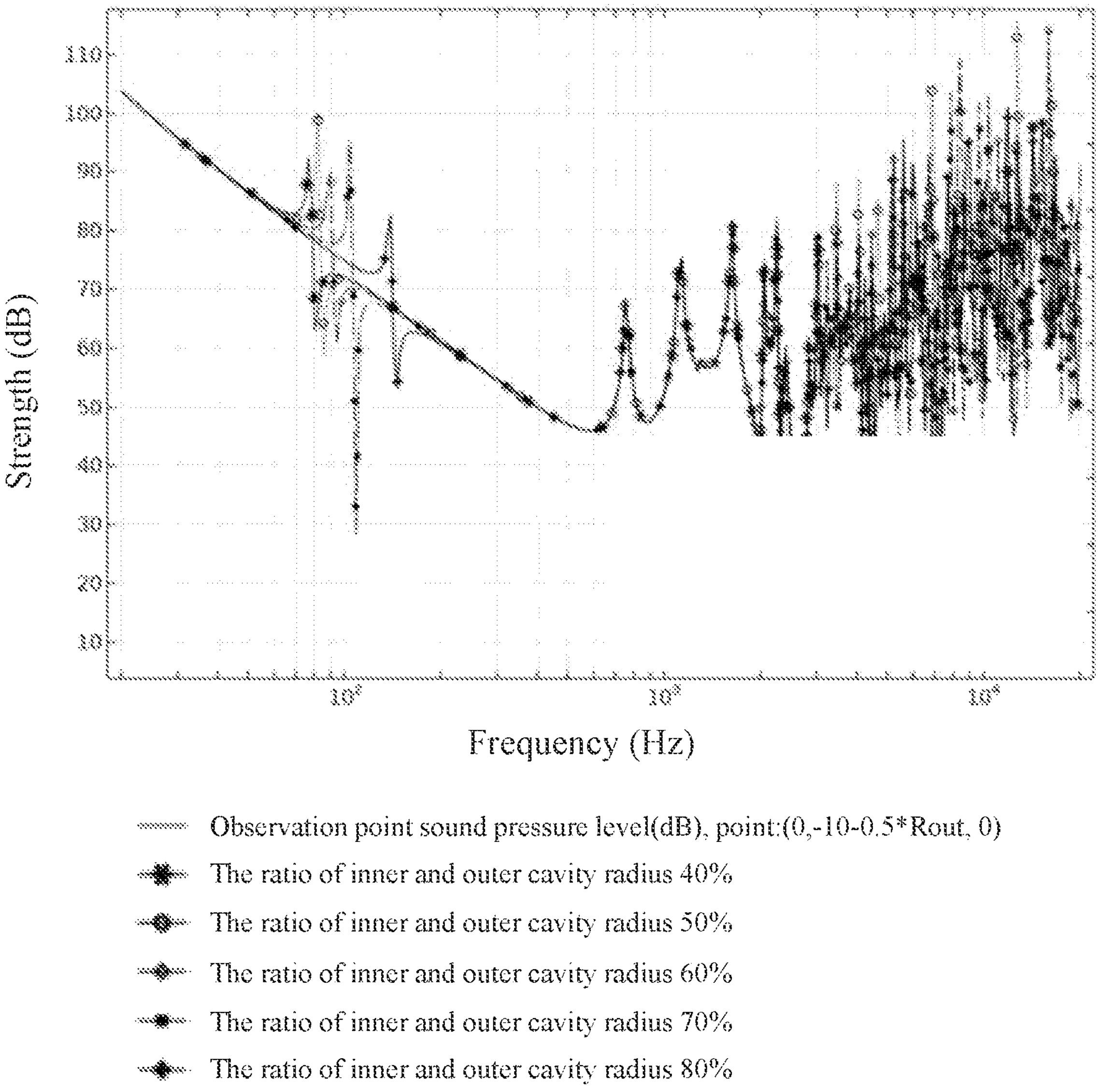
FIG. 10 is a schematic diagram of the frequency response curve of the sound amplification device according to some embodiments of the present disclosure.

FIG. 10 is a schematic diagram of the frequency response curve of the sound amplification device according to some embodiments of the present disclosure. In some embodiments, the sound amplification device described in FIG. 10 may correspond to the double cavity structure shown in FIG. 6 or FIG. 8. In order to facilitate research, the two cavities corresponding to the double-cavity structure use spheres as basic model, that is, the outer box body 212 (and the first chamber 2121 formed by it) and the inner box body 213 (and the second chamber 2131 formed by it) are both spherical. Based on this, according to the formula for calculating the volume of the sphere, the ratio between a volume of the second chamber 2131 and a volume of the first chamber 2121 may be converted into the ratio between the radius of the second chamber 2131 and the radius of the first chamber 2121 (abbreviated as is "the ratio of inner and outer cavity radius"). Of course, in other embodiments, the cavity may also be regular structures such as ellipsoids, cylindricals, bonding bodies, or other irregular structures. In this regard, technical personnel in this technology may also get similar test results.

As shown in FIG. 10, in some embodiments, for different ratios between the volume of different second chamber 2131 and the volume of the first chamber 2121, the larger the ratio between the volume of the second chamber 2131 and the volume of the first chamber 2121, the higher frequency and the lower corresponding intensity of the formant in the low-frequency band (for example, the frequency is less than 500 Hz), which shows that the expressiveness of the bass is greatly affected by the ratio of the inner and outer cavity radius. Preferably, in some embodiments, the ratio between the volume of the second chamber 2131 and the volume of the first chamber 2121 may be within the range of 1:10 to 1:2. Further, it may be seen from FIG. 10 that the frequency response curves almost overlap in the 200-2500 Hz frequency band, which shows that the expressiveness of the midrange is less affected by the ratio of the inner and outer cavity radius.

As mentioned above, in some embodiments, the frequency response curve of the sound amplification device 20 may contain two or more resonance peaks. In other words, the sound amplification device 20 may contain two or more resonance frequency. In some embodiments, considering that when the sound amplification device 20 contains two or more resonance frequencies, if the two adjacent resonance frequencies are too close, wave and wave may affect each other during the vibration transmission process, then leading to sound abnormality, for example, producing a sharper or harsher sound, etc. In this regard, in order to avoid this problem, in some embodiments, the relatively lower one of the two adjacent resonance frequencies of the sound amplification device 20 may be controlled to be less than half of the relatively higher one, or control the relatively higher one of the two adjacent resonance frequencies of the sound amplification device 20 to be more than twice of the relatively lower one. For example, when one resonance peak (low-frequency peak) with a lower frequency among the two adjacent resonance peaks of the sound amplification device 20 is 1 kHz, the one resonance peak (high-frequency peak) with a higher frequency among the adjacent two resonance peaks may be controlled to be above 2 kHz. In the same way, when one resonance peak (high-frequency peak) with a higher frequency among the two adjacent resonance peaks of the sound amplification device 20 is 1 kHz, the one resonance peak (low-frequency peak) with a lower frequency among the adjacent two resonance peaks may be controlled to be below 500 Hz.

In some embodiments, the vibration source 100 may contain two resonance frequencies, and the frequency response curve usually shows a low-frequency peak and a high-frequency peak, for example, one resonance peak is around 100 Hz, and the other resonance peak is above 10 kHz. In some embodiments, in order to avoid the vibration source 100 and the sound amplification device 20 causing a higher order resonant mode during the vibration transmission process, which leads to the sound amplification device 20 producing abnormal sound, the resonance peak of the sound amplification device 20 and the resonance peak of the vibration source 100 may be staggered from each other. For example, in some embodiments, the resonance peak closest to the resonance frequency of the vibration source 100 in the sound amplification device 20 may be controlled to be less than half or more than twice the resonance frequency of the vibration source 100. For example, when the two resonance peaks of vibration source 100 are 100 Hz and 10 kHz, the resonance peak closest to 100 Hz in the sound amplification device 20 may be controlled below 50 Hz or between 200 Hz and 5 kHz, and the resonance peak closest to 10 kHz in the sound amplification device 20 may be controlled between 200 Hz and 5 kHz or above 20 kHz.

It should be noted that in some embodiments, the vibration source 100 may also contain more than two resonance frequencies. When the vibration source 100 contains more than two resonance frequencies, the resonance frequencies of the sound amplification device 20 may be set with reference to the above method, which is not repeated here.

It should also be noted that the frequency parameters of the above resonance peaks are only examples. In the embodiments of the present disclosure, the frequencies corresponding to the resonance peaks of the vibration source 100 and the sound amplification device 20 may be but are not limited to, the values listed above.

In addition, it is necessary to explain that the sound amplification devices shown in FIG. 6 and FIG. 8 are only examples. In some other embodiments, the sound amplification device 20 may include a plurality of inner boxes 213, and a plurality of inner boxes 213 may be placed in the first chamber 2121 at the same time, and divide the first chamber 2121 into a plurality of sub-chambers, such as three, four, five or more than five.

In some embodiments, at least one inner box 213 may have public region with the outer box 212. For example, combined with FIG. 6, the outer box 212 and the inner box 213 have public region 2132. In some embodiments, in order to improve synchronization of the outer box and the inner box, and thereby increase acoustic expressiveness of the sound amplification device 20, the contact region 211 may be disposed in the public region 2132.

In some embodiments, when the first chamber is divided into a plurality of sub-chambers, in order to ensure acoustic expressiveness of the sound amplification device 20, the volume ratio of any two sub-chambers in the plurality of sub-chambers may be controlled between 1:10 and 1:2. For example, when the sound amplification device 20 includes three sub-chambers, its volume ratio may be 1:2:4, and when the sound amplification device 20 includes four sub-chambers, its volume ratio may be 1:2:4:8. It should be noted that the smaller the volume difference of each sub-chamber, the closer the corresponding resonance peak. In some embodiments, in order to make the sound amplification device 20 produce a specific acoustic expressiveness, the volume difference between different sub-chambers may be made as small as possible.

Below, the vibration source 100 involved in the embodiments of the present disclosure is exemplarily described.

In some embodiments, the vibration source 100 may be a part of an earphone, for example, may be an earphone speaker. Specifically, for the earphone speaker, the mechanical vibration generated by it may be transmitted not only through media such as air, but also through media such as the user's skin and bones. The former may generally be called the air conduction earphone, and the latter may generally be called the bone conduction earphone. Because the air conduction earphone and the bone conduction earphone are mechanically vibrated, the technical solutions described in the present disclosure manual may be applied to the air conduction earphone and bone conduction earphone, respectively.

Figure 11:
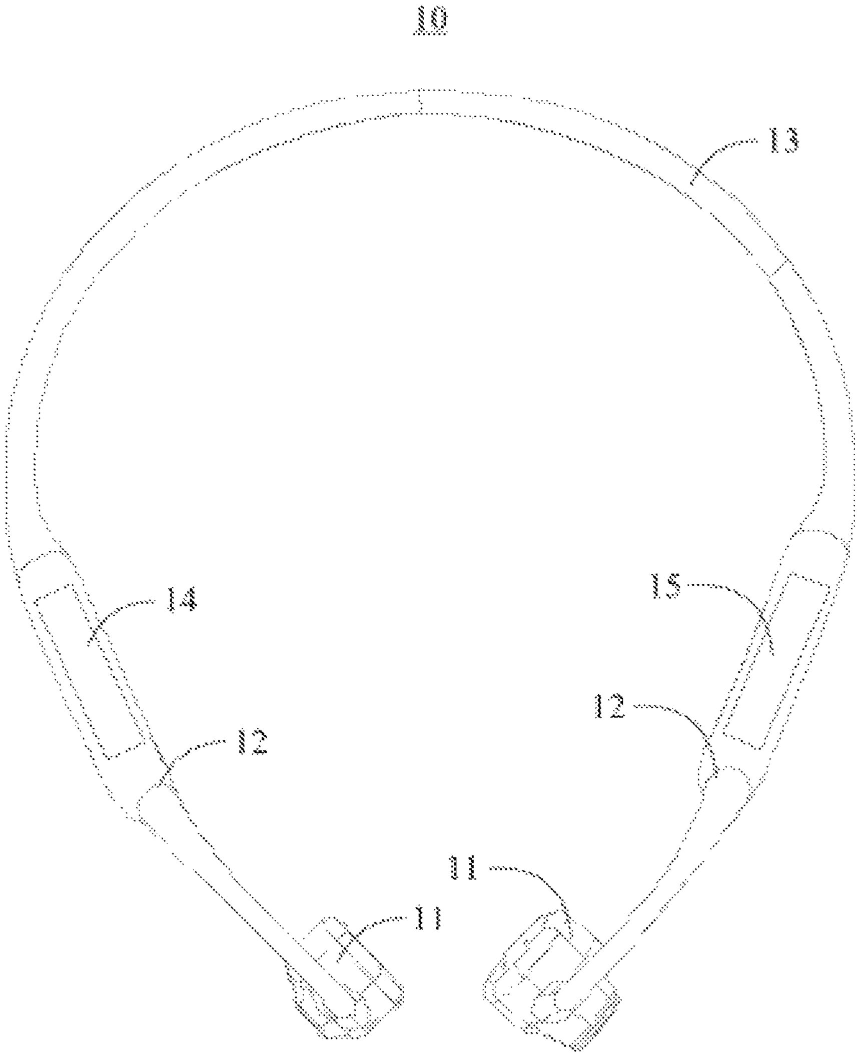
FIG. 11 is a schematic diagram of the sample structure of the earphone according to some embodiments of the present disclosure.

FIG. 11 is a schematic diagram of the sample structure of the earphone according to some embodiments of the present disclosure.

Referring to FIG. 11, in some embodiments, the earphone 10 may include two speakers 11, two ear-hook components 12, and one rear-hook component 13. One end of each ear-hook component 12 connects a corresponding speaker 11, respectively, and the two ends of the rear-hook component 13 are connected to the other end of the two ear-hook components 12, respectively. In other words, in some embodiments, the number of speaker 11 may be two, and the rear-hook component 13 may connect two speakers 11 through the ear-hook component 12, respectively. Further, in some embodiments, both of the two ear-hook components 12 may be curved, so as to be easily hung on the two ears of the user. The rear-hook component 13 may also be curved to facilitate use of the back side of the user's head, and then realize needs of the user wearing earphone 10. This setting may make the two speakers 11 on the left and right side of the user's head when wearing the earphone 10. And under the cooperative action of the two ear-hook components 12 and the rear-hook component 13, the two speakers 11 may clamp the user's head and contact the user's skin, or be fixed near the user's ears so that the earphone 10 may be used to transmit sound based on air conduction technology or bone conduction technology.

It should be explained that: FIG. 11 is only a schematic diagram of the form structure of a common earphone. Technical personnel in this technology field are easy to know that by closely matching other types of earphones with the sound amplification device, mechanical vibration may also be amplified, so as to achieve effect of passive speakers. It should also be explained that the earphone shown in FIG. 11 is only for example, and have an unlimited effect on the shape of the earphone. In some embodiments, the earphone 10 may have only one speaker 11. Correspondingly, in some embodiments, the earphone 10 may not include rear-hook component 13.

In some embodiments, when the user wears the earphone 10, the earphone 10 (specifically may be the speaker 11) unilateral pressure applied to the user's head may be within the range of 0.3 N to 0.4 N. At this time, both the comfort of the user wearing the earphone 10 and acoustic expressiveness (e.g., sound quality, volume, etc.) of the earphone 10 may be well represented. Furthermore, combined with FIG. 11, the skin contact region of the speaker 11 described in the present disclosure may specifically refer to the region where the speaker 11 is in contact with the user's head skin when the user wears the earphone 10. Based on this, in some embodiments, the pressure between vibration source 100 and the contact region 211 may be controlled between 0.3N-0.4N.

Further, the earphone 10 may also include motherboard 14 and battery 15. Combined with FIG. 2, motherboard 14 and battery 15 may connect to two speakers 11 through the corresponding wiring structure (such as wire). At this time, the motherboard 14 may be used to control the sound of speaker 11 (mainly transforming the electrical signal into mechanical vibration), and the battery 15 may be used to provide electrical energy for headset 10 (specifically two speakers 11). Of course, the earphone 10 described in the present disclosure may also include microphones such as microphones and pickups, and may further include functional devices such as USB interfaces and control buttons. They may also be electrically connected to the motherboard 14 and the battery 15 through corresponding wiring structures to achieve corresponding functions. For example, the microphone may realize the functions of call of the earphone 10, the pickup may realize functions of noise reduction of the earphone 10, the USB interface may realize wired charging, data transmission, and other functions of the earphone 10, and the control button may realize opening and closing, volume adjustment, track switching, and other functions of the earphone 10.

It should be explained that combined with FIG. 2, the motherboard 14 and the battery 15 may be respectively arranged in the two ear-hook components 12. This setting may not only increase the total capacity of the battery 15 to improve the battery life of the earphone 10; the weight of the earphone 10 may also be balanced to improve the wearing comfort of the earphone 10.

Based on the above descriptions, when the user wears the earphone 10, the user may hear music, voice, and other sounds through headphones 10. When the user takes off the earphone 10, the sound amplification device 20 described in the embodiments of the present disclosure may be used in conjunction with the earphone 10, so that mechanical vibration of the earphone 10 may be amplified by the sound amplification device 20, so that at least sound heard by the user may be amplified. Volume of the device may be increased (that is, to realize function of sound out), and sound quality may be improved (for example, sound range may be widened). In other words, when the earphone 10 is used in conjunction with the sound amplification device 20, mechanical vibration generated by the speaker 11 may drive the sound amplification device 20 to vibrate along with it, so that the sound amplification device 20 drives air to vibrate. At this time, since the area of the sound amplification device 20 in contact with air is larger, it is beneficial to drive more air to participate in vibration, which is beneficial to improve volume and sound quality of sound heard by the user.

Furthermore, combined with FIG. 11, based on the basic structure of earphone 10, in some embodiments, the number of contact region 211 may be two, and the two contact regions 211 symmetrically set on the relative sides of the outer box 212. This setting allows the rear-hook component 13 (and the ear-hook component 12) of the earphone 10 to be mounted on the outer box 212, and the two speakers 11 are respectively pressed and fixed on the corresponding contact regions 211. In other words, the outer box 212 may be equivalent to the user's head and the earphone 10 holds the outer box 212 may simply be regarded as the user wearing earphone 10. Therefore, based on the above-mentioned description, the pressure of the speaker 11 to the corresponding contact region 211 may be 0.3-0.4 N.

Figure 12:
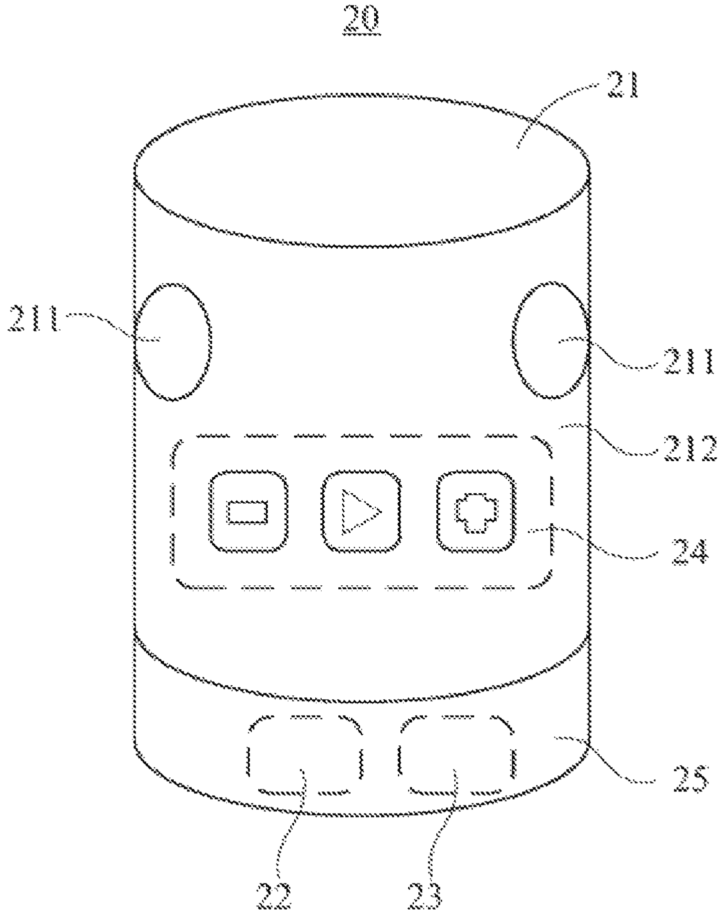
FIG. 12 is a schematic diagram of the sound amplification device according to the other embodiment of the present disclosure.

FIG. 12 is a schematic diagram of the sound amplification device according to the other embodiment of the present disclosure.

As shown in FIG. 12, in some embodiments, the sound amplification device 20 may also include the first wireless charging module 22 set on the outer box 212. The first wireless charging module 22 may be based on QI standard, PMA standard, A4WP standard, and other wireless charging protocols. At this time, the first wireless charging module 22 is configured to be able to wirelessly charge the earphone 10 through the second wireless charging module of the earphone 10. Correspondingly, the second wireless charging module may be based on the QI standard, PMA standard, A4WP standard, and other wireless charging protocols. In some embodiments, the contact region 211 may be set up with a contact detection element to detect whether the speaker 11 is currently accommodated in the contact region 21. Specifically, if the contact detection element detects the speaker 11 is currently accommodated in the contact region 211, the wireless charging function is enabled to perform wireless charging on the earphone 10. Conversely, controlling the first wireless charging module 22 in a dormant state.

In some embodiments, the contact detection element may be at least one of a pressure sensor, a close communication module, or an itinerary switch. In some embodiments, the contact detection element may be arranged on a plane in the contact region 211 that is not perpendicular to the vibration direction of the speaker 11, such as the side wall of the recess corresponding to the contact region 211, so as to prevent the vibration of the speaker 11 from affecting the detection result.

Further, in some embodiments, the sound amplification device 20 may also include the first wireless communication module 23 and control module 24 set up on the outer box 212 or internally. The first wireless communication module 23 may communicate based on wireless communication technologies such as Bluetooth, ZigBee, NFC, and control module 24 may generate the corresponding control signal based on the physical button revealed in the outer box 212. At this time, the control module 24 may connect the earphone 10 through wireless communication between the first wireless communication module 23 and the second wireless communication module of the earphone 10 and send the control signal to it. In the same way, the second wireless communication module may be based on wireless communication technologies such as Bluetooth, ZigBee, NFC, and may be integrated into the motherboard 14. In other words, when the sound amplification device 20 is used in conjunction with the earphone 10, not only may the sound output function be realized through the cooperation between the box 21 and the speaker 11, but also the wireless charging function may be realized through the cooperation between the first wireless charging module 22 and the second wireless charging module, and it is also possible to establish a wireless communication connection with the second wireless communication module through the first wireless communication module 23 to realize functions such as music playback, volume control, track switching, and voice call control.

It should be noted that in some embodiments, the first wireless charging module 22 in addition to the wireless charging of the earphone 10, may also perform wireless charging for electronic devices such as mobile phone and wireless earphone. In some embodiments, the sound amplification device 20 may also be further settled by the fast charging module (not shown in FIG. 12) to facilitate fast charging for electronic devices such as mobile phone and tablet computer. In some embodiments, there are corresponding interfaces on the sound amplification device 20, such as USB interface, Type-C interface, lighting interface, etc.

Exemplarily, combined with FIG. 12, in some embodiments, the first wireless charging module 22 may be independent of the outer box 212. For example, the sound amplification device 20 may be additionally provided with a base 25, the base 25 is connected to the outer box 212, and the first wireless charging module 22, the first wireless communication module 23, and the above-mentioned fast charging module may all be arranged in the base 25. This setting may avoid the sound amplification device 20 from having a great impact on acoustic expressiveness of the box 21 after integrating too many functional modules.

In some embodiments, the base 25 may be made with a small elastic modulus material, so as to avoid abnormal sounds generated due to vibrations relative to the objects when the sound amplification device 20 is placed on other objects. In some embodiments, the elastic modulus of the corresponding material of the base 25 may be between 1-3 GPa, specific, in some embodiments, the elastic modulus of the corresponding material of the base 25 may be between 1-2.5 GPa. In some embodiments, the elastic modulus of the corresponding material of the base 25 may be between 1.5-3 GPa. In some embodiments, the material may be polycarbonate, polyamide, acrylonitrile-butadiene-styrene copolymer, etc.

Exemplarily, combined with FIG. 12, in some embodiments, there are buttons on the outer box 212, such as multi-function buttons, volume plus buttons, volume reduction keys, etc., to control the earphone 10 to realize operations such as playing, pausing, cutting songs, and adding and subtracting the volume. In some embodiments, multi-function buttons may support a plurality of control methods. For example, short pressing may achieve play and pause functions, and quickly and continuously pressing two times may achieve song cutting function. In the same way, in some embodiments, the volume plus button short pressing may achieve the volume increase function, and long pressing may achieve continuous and fast volume increase function; the volume reduction button short pressing may achieve the volume reduction function, long pressing may achieve the fast volume reduction function.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to “an embodiment” or “one embodiment” or “an alternative embodiment” in various portions of this specification are not necessarily all referring to the same embodiment. Furthermore, the particular features, structures, or features may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, micro-code, etc.), or combining software and hardware implementation that may all generally be referred to herein as a “unit,” “module,” or “system.” Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier “about,” “approximately,” or “substantially” in some examples. Unless otherwise stated, “about,” “approximately,” or “substantially” indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A sound amplification device, comprising a vibrating body, the vibrating body including at least one first vibration surface and at least one contact region for contacting with a vibration source; wherein, the vibration source detachably contacts with a contact region, an area of a first vibration surface is larger than an area of the contact region, the vibration source is configured to generate vibration, and the vibration is transmitted to the first vibration surface through the contact region, and further transmitted outwards through the first vibration surface, wherein the vibration source is a part of an earphone, the vibration is generated by the part of the earphone, the earphone is a bone conduction earphone, and the vibration is generated by a part of the bone conduction earphone.

2. The sound amplification device of claim 1, wherein the vibrating body includes an outer box, an inner wall of the outer box constitutes a first chamber, an outer wall of the outer box constitutes the first vibration surface, and the contact region is disposed on the outer wall of the outer box.

3. The sound amplification device of claim 2, wherein the contact region is recessed inward relative to the outer wall of the outer box to accommodate the vibration source.

4. The sound amplification device of claim 3, wherein a direction of the vibration received by the contact region is perpendicular to at least partial area of the outer box.

5. The sound amplification device of claim 2, wherein the vibrating body further includes at least one inner box, the at least one inner box being arranged in the first chamber and dividing the first chamber into at least two sub-chambers.

6. The sound amplification device of claim 5, wherein a volume ratio of any two sub-chambers in the at least two sub-chambers is between 1:10 and 1:2.

7. The sound amplification device of claim 5, wherein the sound amplification device includes at least two resonance frequencies, and the at least two resonance frequencies include a first resonance frequency and a second resonance frequency adjacent to the first resonance frequency, wherein the second resonance frequency is below a half of the first resonance frequency or exceeds twice the first resonance frequency.

8. The sound amplification device of claim 7, wherein the vibration source includes a third resonance frequency and a fourth resonance frequency, and the resonance frequency closest to the third resonance frequency among the at least two resonance frequencies of the sound amplification device is below a half of the third resonance frequency or exceeds twice the third resonance frequency, the resonance frequency closest to the fourth resonance frequency among the at least two resonance frequencies of the sound amplification device is below a half of the fourth resonance frequency or exceeds twice the fourth resonance frequency.

9. The sound amplification device of claim 5, wherein at least one of the inner box and the outer box has a public region, and at least one contact region is arranged in a common region.

10. The sound amplification device of claim 1, wherein an elastic modulus of the contact region is smaller than elastic moduli of other regions of the vibrating body.

11. The sound amplification device of claim 10, wherein the elastic modulus of the contact region is 1-3 GPa, and elastic moduli of other regions of the vibrating body are 6-8 GPa.

12. The sound amplification device of claim 3, wherein a pressing force between the vibration source and the contact region is 0.3N-0.4N when the vibration source is accommodated in the contact region.

13. The sound amplification device of claim 3, wherein the vibration source includes a second vibration surface, and when the vibration source is accommodated in the contact region, the contact region between the vibration source and the contact region is not less than 50% of the second vibration surface.

14. The sound amplification device of claim 1, wherein a wireless charging module is configured on the vibrating body, and the wireless charging module is used for wirelessly charging the bone conduction earphone when the part of the bone conduction earphone is accommodated in the contact region.

15. The sound amplification device of claim 14, wherein the contact region is provided with a contact detection element, and the wireless charging module enables a wireless charging function to charge the bone conduction earphone when the contact detection element detects that the part of the bone conduction earphone is accommodated in the contact region.

16. The sound amplification device of claim 15, wherein the contact detection element includes at least one of a pressure sensor, a short-range communication module, or a travel switch.

17. The sound amplification device of claim 15, wherein the sound amplification device further includes a wireless communication module and a control module, wherein the wireless communication module is configured to establish a wireless communication connection with the bone conduction earphone when the contact detection element detects that the part of the bone conduction earphone is accommodated in the contact region, and the control module is configured to control the bone conduction earphone based on the wireless communication connection.

* * * * *